United States Patent
Al Khazim Al Ghamdi

(10) Patent No.: US 9,332,739 B2
(45) Date of Patent: May 10, 2016

(54) LOCAL BEE HIVE WITH SYSTEM TO CONTROL THE HUMIDITY AND TEMPERATURE INSIDE IT

(75) Inventor: Ahmad Al Khazim Al Ghamdi, Riyadh (SA)

(73) Assignee: King Saud University, Riyadh (SA)

(*) Notice: Subject to any disclaimer, the term of this patent is extended or adjusted under 35 U.S.C. 154(b) by 50 days.

(21) Appl. No.: 13/884,972

(22) PCT Filed: Nov. 2, 2011

(86) PCT No.: PCT/EP2011/005525
§ 371 (c)(1),
(2), (4) Date: May 13, 2013

(87) PCT Pub. No.: WO2012/092938
PCT Pub. Date: Jul. 12, 2012

(65) Prior Publication Data
US 2013/0273808 A1    Oct. 17, 2013

(30) Foreign Application Priority Data
Jan. 7, 2011 (EP) ..................... 11000096

(51) Int. Cl.
*A01K 47/06* (2006.01)
(52) U.S. Cl.
CPC ...................... *A01K 47/06* (2013.01)
(58) Field of Classification Search
CPC .............................. A01K 47/06; A01K 47/00
USPC ................................................. 449/3, 13, 29
IPC ........................................... A01K 47/00, 47/06
See application file for complete search history.

(56) References Cited

U.S. PATENT DOCUMENTS

| | | | |
|---|---|---|---|
| 4,135,265 A * | 1/1979 | Van de Kerkof | 449/7 |
| 5,407,129 A * | 4/1995 | Carey | A01K 1/0047 165/205 |
| 5,575,703 A * | 11/1996 | Stearns | 449/13 |
| 5,799,614 A | 9/1998 | Greenwood | |
| 8,602,837 B1 * | 12/2013 | Allan | A01K 67/033 449/1 |
| 2007/0218804 A1 | 9/2007 | Allan et al. | |
| 2008/0064298 A1 | 3/2008 | Junqueira de Souza et al. | |
| 2010/0062683 A1 * | 3/2010 | Brundage | 449/1 |

FOREIGN PATENT DOCUMENTS

| | | | |
|---|---|---|---|
| FR | 2839613 | * 11/2003 | A01K 53/00 |
| WO | 00/57694 | 10/2000 | |

OTHER PUBLICATIONS

Goodman, "Hot wax dipping of beehive components for preservation and sterilization", published May 2001.*
PCT/EP2011/005525; PCT International Search Report and Written Opinion of the International Searching Authority mailed Jan. 18, 2012.

* cited by examiner

*Primary Examiner* — Kathleen Alker
(74) *Attorney, Agent, or Firm* — Renner, Otto, Boisselle & Sklar, LLP

(57) ABSTRACT

The invention relates to a bee hive system which includes a housing, at least one ambient condition sensor being adapted to sense an ambient condition in the housing, a first fan being adapted to generate an air flow in at least a portion of the housing, a container for a liquid having an opening, in which the container is arranged such that the air flow generated by the first fan at least partially passes the opening of the container, electronics connected to the ambient condition sensor and to the first fan, in which the electronics controls the first fan according to the sensed ambient condition.

16 Claims, 4 Drawing Sheets

LOCAL BEE HIVE WITH SYSTEM TO CONTROL THE HUMIDITY AND TEMPERATURE INSIDE IT

The present application is a U.S. National Stage Application based on and claiming benefit under 35 U.S.C. §371 of PCT/EP2011/005525, filed 02 Nov. 2011, which in turn claims priority to European Application No. 11000096.5, filed 07 Jan. 2011, the entirety of both of which are hereby incorporated herein by reference.

The present invention relates to beehives and, in particular, to beehives with a controlled microclimate inside the beehive.

Due to high temperature and dryness, a high percentage of honeybees dies in dry regions, like, e.g., parts of Saudi Arabia during summer. Moreover, eggs of the queen will not hatch if the humidity is too low. This leads to a major loss for local honeybee keepers.

It remains therefore a continuous need for an improved beehive system that may also be used in dry and hot regions.

The present invention solves the problem by a beehive system according to claim 1 and a method according to claim 16.

In particular, the beehive system comprises a housing with at least one ambient condition sensor being adapted to sense an ambient condition in the housing. Further, the beehive system comprises a first fan being adapted to generate an air flow in at least a portion of the housing and a container for a liquid having an opening. Moreover, the container is arranged such that the air flow generated by the first fan at least partially passes the opening of the container. The beehive system, in addition, comprises electronics connected to the ambient condition sensor and to the first fan. The electronics controls the first fan according to the sensed ambient condition.

Here, the term of the air flow at least partially passing the opening of the container does not necessarily imply the air flow being directed towards the container or the liquid contained therein. The air flow may also be directed substantially parallel to a surface of the liquid or to the opening.

The present invention solves the above problem by providing an air flow inside the housing, which is controlled by the electronics according to a sensed ambient condition in the housing. The generated air flow may provide a cooling. Moreover, with a liquid being filled in the container, the air flow passing the opening of the container will lead to an increased evaporation of the liquid. The resulting vapor increases the humidity in the housing.

In a preferred embodiment, the first fan is arranged at the opening of the container.

Here, the air flow is directed over the surface of the liquid in the container. This leads to an improved air exchange in the region above the liquid surface and, thereby, to an improved evaporation of the liquid. Hence, the humidity in the housing may be increased more efficiently.

According to a preferred embodiment, the opening of the container is further provided with a barrier which is adapted to let air pass through.

The barrier prevents dirt and bees from entering the container. Especially when the fan is activated, the generated air flow may drive dirt or bees towards the container. The barrier, in particular, prevents the bees from being driven into the liquid.

Further, according to an even more preferred embodiment, the barrier comprises a board with holes, a net and/or a mesh-like structure.

A board with holes, a net or a mesh-like structure are easy to fabricate and are usually readily available in places where beehives are positioned. Moreover, they allow for an increased air flow through the barrier as compared to permeable membranes, which would otherwise be used, and which may also used in conjunction with the present invention.

Alternatively or additionally, the barrier comprises an aperture and the first fan is arranged in the aperture of the barrier.

In this embodiment, the first fan is arranged in the opening of the container. Hence, the air flow generated by the first fan is more efficiently directed towards the surface of the liquid. This facilitates evaporation of the liquid and helps to increase the humidity in the housing. Moreover, with this arrangement, the first fan generates an air flow which is directed into the housing. The wet air is thus effectively drawn from the container into the housing.

In a preferred embodiment, the system further comprises removable frames being arranged in the housing.

The frames assist the bees building their honeycombs. Providing frames usually leads to the bees building their honeycombs into the frames rather than to other parts of the housing. The honeycombs may easily be retrieved by removing the frames from the housing.

In particular, the system may comprise between 5 and 20, preferably between 6 and 12, more preferably between 6 and 9 and most preferably 7 or 8 removable frames being arranged in the housing.

Given the usual dimensions of beehive housings, these numbers of frames provide frames of a good size for honeybees to build honeycombs into. Moreover, the preferred number of frames leads to larger distances between the frames, such that the air flow can pass between the frames, leading to a better control of the ambient conditions in the housing.

In addition or alternatively, the removable frames may be arranged above the container.

In these embodiments, the wet air rising from the container passes between the frames. Hence, the humidity experienced by the bees is efficiently increased.

According to a preferred embodiment, the container is placed inside the housing or under the housing.

Placing the constant container inside the housing has the benefit of protecting the liquid inside the container from external influences like, for example from other animals drinking from the liquid. Moreover, in these embodiments, most of the evaporated liquid passes through the housing.

Placing the container under the housing facilitates refilling the container when it is empty. Here, the housing does not need to be opened for refilling.

In addition or alternatively, the container may further comprise a port for refilling the liquid.

This embodiment allows the beekeeper to refill the liquid in the container without the need to disassemble the bee hive system. In embodiments, in which the container is placed inside the housing, the housing may further comprise a connecting port that allows access to the port of the container to refill the container.

Additionally or alternatively, the bee hive system further comprises a tube with first and second open ends, the first end of the tube being in communication with the container and the second end being accessible from outside the beehive for refilling the container with liquid.

This embodiment facilitates refilling the liquid in the container. The second end of the tube can easily be used to refill the liquid from outside, e.g., by means of a funnel, which may also be comprised by the bee hive system. In particular, the first end of the tube may be positioned in the container.

In embodiments in which the container comprises a port, the tube may further be connected to said port.

In a preferred embodiment, the container further comprises at least one ventilation hole in a top section of the container.

As during operation, the first fan draws wet air from the container, the air pressure drops in a top section of the container above the liquid surface. Providing a ventilation hole, air from outside the container is drawn in and is subsequently humidified by the evaporating liquid.

In a preferred embodiment, the ambient condition sensor further comprises at least one humidity sensor and the electronics activates the first fan if the sensed humidity is below a lower humidity threshold.

In this embodiment, when the humidity is too low, the fan is activated, generating an air flow over the surface of the liquid in the container. Thus, the evaporation of the liquid is enhanced, such that the humidity is increased. The first fan, moreover, helps to distribute the wet air in the housing.

In particular, the lower humidity threshold may be between 30% and 70%, preferably between 40% and 60% and most preferably between 45% and 55% relative humidity.

These values have been experience to be minimum humidity values for the honeybees to survive and for the eggs of the bee queen to be hatched.

Additionally or alternatively, the electronics deactivates the first fan if these sensed humidity is above an upper humidity threshold.

These embodiments prevent the humidity in the housing from rising above a given value. When the fan is deactivated, the air flow stops and the air exchange above the surface of the liquid in the container is minimized. The evaporation of the liquid is thus diminished.

In particular, the upper humidity threshold is between 50% and 90%, preferably between 60% and 80% and most preferably between 65% and 75% relative humidity.

These upper humidity threshold values have been experienced to provide a good condition for the honeybees to survive and for the eggs of the queen to be hatched.

In a preferred embodiment, the beehive system further comprises a second fan adapted to generate an air flow in at least a portion of the housing, wherein the second fan is connected to the electronics and the electronics controls the second fan according to the sensed ambient condition.

This provides a second source for an air flow in the housing. This allows for a more favorable distribution of the air flow in the housing. Moreover, the overall air flow may be increased by using two fans.

It is even more preferred that the second fan is arranged in a top section of the housing.

This is especially advantageous with the first fan being arranged near the bottom of the housing. Here, air flows may be generated, both, on the top and the bottom parts of the housing. Moreover, these embodiments have the benefit of allowing an independent control of both air flows. In addition, with the second fan being arranged at the top of the housing, the air flow generated by the second fan does not substantially pass over the surface of the liquid in the container. Hence, activation or deactivation of the second fan has a lower effect on the humidity in the housing than activation or deactivation of the first fan.

In a preferred embodiment, the ambient condition sensor comprises at least one temperature sensor and the electronics activates the first and/or second fan, respectively, if the sensed temperature is above an upper temperature threshold.

In these embodiments, an air flow is generated in the housing if the air is too hot. The generated air flow leads to a increased ventilation in the housing.

In embodiments with a second fan being arranged in a top section of the housing, it is favorable if the electronics activates the second fan if the sensed temperature is above the upward temperature threshold. With the second fan being further away from the container with the liquid, activating the second fan has a lower impact on the humidity, and mostly helps to influence the temperature in the housing.

In particular, the upper temperature threshold may be between 30° C. and 38° C., preferably between 32° C. and 36° C. and most preferably between 33° C. and 35° C.

These upper temperature threshold values provide a good condition for the bees to survive and for the eggs of the queen to be hatched.

Alternatively or in addition, the electronics may deactivate the first fan and/or the second fan, respectively, if the sensed temperature is below a lower temperature threshold.

Deactivating the fan will decrease the air flow in the housing. This leads to an increase of the temperature. In embodiments with a second fan, it is moreover preferred that the electronics deactivates the second fan if the sensed temperature is below the lower temperature threshold. This influences the temperature more selectively than controlling the first fan as the first fan due to being close to the liquid also affects the humidity in the housing.

In particular, the lower temperature threshold may be between 28° C. and 36° C., preferably between 30° C. and 34° C. and most preferably between 31° C. and 33° C.

The slower temperature thresholds provide a good surviving condition for honeybees and for the eggs of queen to be hatched.

According to a preferred embodiment, the ambient condition sensor comprises two or more humidity sensors and/or temperature sensors. In these embodiments, the sensed humidity and/or temperature corresponds to an average humidity and/or temperature sensed by the humidity and/or temperature sensors, respectively.

Using two or more sensors in the housing facilitates sensing the ambient conditions in different parts of the housing. Moreover, the condition in the housing can be sensed more accurately, for example in the case that one sensor is covered by dirt or by bees.

The two or more humidity sensors are used to obtain an averaged humidity. Here, the averaged humidity does not necessarily need to correspond to an arithmetic average. Rather, also a median or a weighted average may be used. Using a median is, in particular, useful if one of the sensors exhibits a failure or is covered. Using a weighted average is helpful to obtain more accurately the ambient condition experienced by the bees, as some of the sensors may be arranged further away from the honeycombs than others. Alternatively, any other kind of averaging may be used.

According to a preferred embodiment, the ambient condition sensor comprises at least one humidity sensor and at least one temperature sensor and the electronics controls the first fan and/or the second fan according to the sensed humidity and the sensed temperature.

In this embodiment, both, the humidity and the temperature inside the housing is evaluated. Hence, More detailed information is used to control the first and/or second fan.

According to an even more preferred embodiment, the humidity sensor and the temperature sensor are arranged as a unit to form a dual sensor.

The dual sensor may comprise any form of attachment between the temperature sensor and the humidity sensor. E.g., both sensors may be arranged in a common package or may be fixed to the same strip of material. In this embodiment, sensing the humidity and temperature at the same position inside the housing as facilitated. Moreover, placing only one sensor is needed as compared to using separate sensors for humidity and temperature.

In an even more preferred embodiment, the system further comprises two or more, preferably between 3 and 10 and most preferably between 4 and 8 dual sensors.

This number of dual sensors has proven to be effective for sensing the ambient conditions in the housing. Using a larger number of sensors may lead to a more accurate mapping of the ambient conditions and the housing, while also the cost and effort for installation and controlling are increased. Using a lower number of sensors may lead to a less precise measurement of the ambient conditions and may, moreover, lead to failure if one or more of the sensors fail.

In a preferred embodiment, the system further comprises an external ambient condition sensor positioned outside the housing and connected to the electronics, wherein the electronics further controls the first and/or second fan according to the ambient condition sensed by the external sensor.

In this embodiment, the fan is controlled based on the ambient condition around the bee hive. If, for example, the outside air is wet due to falling rain, the electronics may direct the second fan to draw in air from the outside to increase the humidity inside the housing rather than directing the first fan to increase evaporation of the liquid. A more detailed control of the conditions in the housing is thus provided. The external ambient condition sensor may further comprise a humidity, a temperature and/or a dual sensor.

According to a preferred embodiment, the system further comprises powering means being connected to the electronics and/or the fan, wherein the powering means comprises a battery and/or a solar cell.

This embodiment renders the bee hive system independent from any electronic network. Especially in rural areas, this may be a more reliable supply for electric power than the local electric network. However, power may also be supplied to the electronics and/or the first and/or second fan via an electric network. Still, using a solar cell is especially preferred as the areas, in which the present invention is most useful in terms of controlling the temperature and humidity for the bees, usually have a lot of sunshine.

In some embodiments, the first and/or second fan may have an operating voltage of 12 V DC. This is beneficial for the use of standard car batteries for power supply. In other alternatives, the first and/or second fan may have an operating voltage of 110 V and/or 220 V AC. As these are typical supply voltages for electrical networks in many parts of the world, the fan can easily be plugged into a standard power socket.

Moreover, the first and/or second fan and/or the electronics may further comprise means for converting supplied electrical power. E.g., the electronics may comprise a converter that is adapted to convert any of a 110 V and a 220 V AC supply voltage to 12 V DC voltage which is then used to power the electronics and the first and second fan. The converting means may automatically detect the supply voltage and convert it accordingly.

The electronics may further comprise any type of analog and/or digital and/or mixed-signal electronics. In particular, the electronics may comprise a digital microcontroller like, e.g., an ASIC. The electronics may further comprise at least one analog-to-digital converter for converting signals received from the ambient condition sensor.

In a preferred embodiment, the electronics further comprises a writable memory and, in particular, a re-writable memory to store program data and/or parameter values.

In this embodiment, rules, according to which the electronics controls the first and/or second fan may be updated. In particular, it may be beneficial to change upper and/or lower humidity and/or temperature thresholds if any modification is done to the beehive system. E.g., the electronics may be updated to provide the first and/or the second fan with an increased power, thereby intensifying the air flow, if the number of frames in the housing is increased. In this embodiment, the electronics can easily be updated without the need to replace any electronic elements. Moreover, the sensed ambient conditions may be stored in the memory for later evaluation. The writable memory may, e.g., comprise DRAM, SRAM, flash memory, printer with paper, a hard disk or any other type of electrical, mechanical, magnetic or optical memory. Using a re-writable memory, moreover, allows for re-use of the memory.

Alternatively, or in addition, the electronics may further comprise an interface for exchanging a program and/or a data with an electronic device and/or a storage medium.

Here, the data may, for example comprise the sensed humidity and/or temperature values. This embodiment provides the benefit of allowing a user to monitor the ambient conditions in the beehive online via the interface. The interface may, e.g., comprise a standard USB interface. Additionally or alternatively, the interface may comprise a different wired or wireless communication standard like a serial or parallel port, LAN, WLAN or Bluetooth, etc. Providing a wireless interface like WLAN or Bluetooth allows the beekeeper to remotely contact the electronics without the need to provide a physical wiring.

The storage medium may, e.g., comprise a hard disk, a CD-ROM, a DVD or any other electronic, magnetic or optical storage medium.

In addition, the interface may be used to update a program stored in a writable memory of the electronics. This way, the program can easily be modified, e.g., if a sensor is added to the system or the first and/or second fan is replaced with another fan having different electrical characteristics like operating voltage without the need to replace the electronics.

In a preferred embodiment, the container is comprised of plastic or wood, in particular waxed wood.

Plastic and waxed wood provide the benefit of being watertight. Moreover, they are not prone to corrosion as compared to some metals, which would otherwise be used. However, in some embodiments of the present invention, the container may comprise a metal. Here, aluminum is a preferred, as it does not corrode and is easy to process.

Moreover, waxed wood is preferred since wood and bee wax are usually readily available in those regions, on which beehives are placed. Moreover, renovation of a worn-out container can easily be done by the beekeeper by re-waxing the container surface. In addition, waxed wood and plastic containers are usually quite cheap.

In addition, the container may comprise a level sensor for sensing the filling level of the liquid in the container. In this embodiment, the beehive system further comprises a liquid indicator being connected to the level sensor for indicating the liquid filling level. The indicator may, e.g., comprise an LCD display or a light indicator.

In this embodiment, the beekeeper can easily check the filling level without the need to look into the container. Moreover, a light indicator may be visible from afar, such that the beekeeper does not need to approach the bee hive to check the filling level.

The level sensor may further be connected to the electronics. This is especially useful if the electronics comprises an interface for exchanging data with an electronic device. This way, the filling level may easily be indicated to the beekeeper via a standard interface and monitoring means.

Moreover, the container may further comprise a sponge. This is beneficial as the sponge is capable of absorbing a larger amount of water.

According to a preferred embodiment, the housing further comprises one or more ventilation openings.

Providing one or more ventilation openings has the benefit of allowing air exchange between the inside and the outside of the housing other than through an entrance opening for the bees. Fresh air may be drawn into or expelled out of the bee hive to affect the temperature and humidity in the bee hive.

In an even more preferred embodiment, the ventilation openings are arranged in a top section of the housing.

This is especially preferred when a second fan is used which is arranged in a top section of the housing. This way, the second fan is arranged close to the ventilation openings, such that the second fan may be used to control the air exchange with the outside. Using the beehive system in a dry area, the second fan may thus be used to blow in dry air from the outside into the housing or to blow a wet air from inside the housing to the outside.

Additionally or alternatively, the ventilation openings may be arranged in a vertical side wall of the housing.

This is beneficial over arranging the ventilation openings in a horizontal top cover of the beehive, where they might otherwise be arranged, as a vertical positioning prevents dropping rain or dirt from entering the housing and disturbing the bees.

The ventilation opening may further comprise a cover for preventing dirt from entering through the ventilation opening.

Moreover, in some embodiments, the system may comprise more than two fans to provide a more detailed control of the air flow in the housing. The fans are connected to and controlled by the electronics.

In a further aspect, the invention provides a method for altering an ambient condition in a bee hive comprising: sensing the ambient condition in the bee hive, and controlling a first fan according to the sensed ambient condition.

The sensed ambient condition may, in particular, comprise a humidity and/or a temperature. Preferably, altering an ambient condition comprises increasing a humidity and/or lowering a temperature. Additionally or alternatively, the method may further comprise the step of providing a liquid adjacent to an air flow generated by the first fan. Further aspects disclosed in the context of the bee hive system of the present invention may also be used in conjunction with the above method.

Further features and advantages of the present invention are illustrated by the following description of preferred embodiments.

Figure 1:
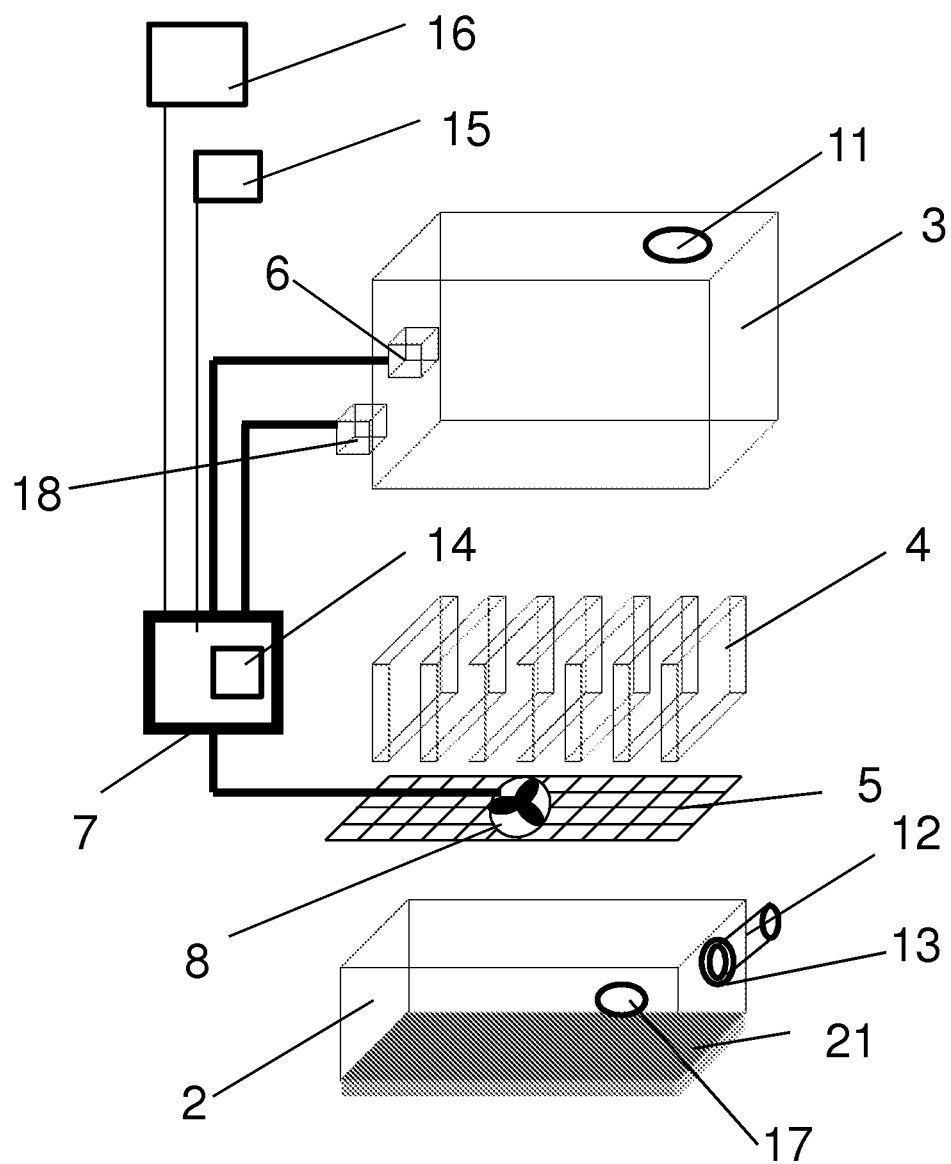
FIG. 1 shows a schematic drawing of a beehive system according to a first embodiment of the present invention comprising one ambient condition sensor.

The beehive system according to a first embodiment of the present invention as shown in FIG. 1 comprises a housing 3 and a container 2 which is filled with a liquid 21. The housing 3 is adapted to be a put on top of the container 2. In the embodiment shown on FIG. 1, the housing 3 is in the form of a box, which is open on a bottom side.

The beehive system, moreover, comprises a barrier 5 in the form of a mesh. The mesh is a wire mesh with a mesh size adapted to prevent bees from passing through. The barrier 5 is adapted to be positioned between the housing 3 and the container 2. The barrier 5 defines a plane. It substantially separates the housing 3 from the container 2. In particular, the barrier 5 prevents bees from entering the container 2 from the housing 3.

In the center of the barrier 5, there is an aperture in which a first fan 8 is arranged. The plane of rotation of the first fan 8 is parallel to the plane defined by the barrier 5. Hence, the first fan 8 is adapted to generate an air flow from the container 2 to the housing 3.

In another embodiment not shown, the barrier comprises a plurality of apertures, and in each aperture, a respective fan is arranged. This leads to air flows being generated at different positions in the plane of the barrier. Ventilation in the housing and distribution of vapor may thus be optimized.

The beehive system of FIG. 1 further comprises electronics 7 to control the first fan 8. The electronics 7 is, moreover, connected to an ambient condition sensor 6, which takes the form of a dual sensor for, both, temperature and humidity. The ambient condition sensor 6 is arranged on a side wall of the housing 3. The electronics 7 controls the first fan 8 according to signals from the ambient condition sensor 6.

In other embodiments, the sensor may be placed in other positions in the housing, like, e.g., on an under side of a top cover.

Returning to FIG. 1, in some embodiments, controlling the first fan 8 may comprise complete activation or deactivation of the first fan 8. In these embodiments, the first fan 8 either runs on a maximum power or is completely switched off, based on the sensed ambient conditions. For example, the electronics 7 may switch on the first fan 8 if the sensed temperature is above 34° C. and switch off the first fan 8 if the sensed temperature is below 32° C. Additionally or alternatively, the electronics 7 may switch on the first fan 8 if the sensed humidity is below 50% and switch off the first fan 8 if the sensed humidity is above 70%. In all other cases, the electronics 7 does not change the previous powering state of the first fan 8.

Referring still to FIG. 1, the system may further include a ventilation hole or ventilation opening 11 in the top of the housing 3, which ventilation hole or ventilation opening 11 could also be in a side of the housing. In addition, a tube 12 with first and second open ends, the first end of the tube 12 being in communication with the container and the second end being accessible from outside the beehive, may be provided for refilling the liquid in the container. The container may include a port 13 for refilling the liquid in the container. The electronics 7 may include a rewritable memory 14 to store program data, parameter values and/or the sensed ambient condition. The system may further include an interface 15 for exchanging a program and/or data with an electronic device and/or a storage medium. The system includes a power supply 16, which may be a solar cell, such as the solar cell 10 shown in FIG. 3, or a battery.

In other embodiments, the electronics 7 may control the first fan 8 to switch to intermediate power values larger than 0% and lower than 100%, too. Here, both, continuous and discontinuous power values may be used.

Figure 4:
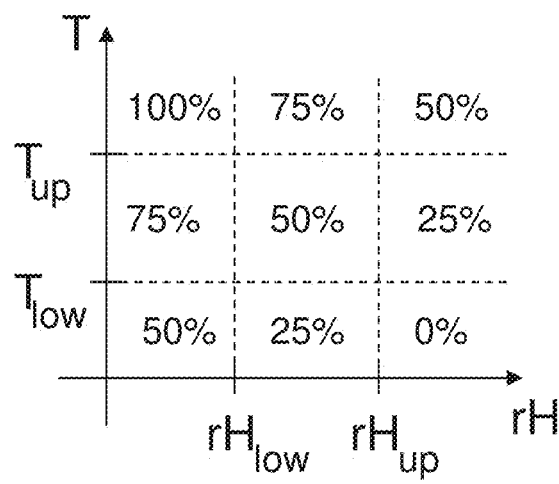
FIG. 4 shows a control diagram to be used with the system according to the first embodiment.

FIG. 4 shows an example of a control diagram which may be used for the electronics 7. Here, a temperature axis (T) and an axis of relative humidity (rH) is shown. On the temperature axis, an upper temperature threshold $T_{up}$ and a lower temperature threshold $T_{low}$ are indicated. Similarly, on the axis of relative humidity, an upper humidity threshold $rH_{up}$ and a lower humidity threshold $rH_{low}$ are shown. The diagram illustrates how the electronics 7 controls the first fan 8. E.g., if the sensed temperature is above the upper temperature threshold $T_{up}$ and the sensed humidity is below the lower humidity threshold $rH_{low}$, the electronics 7 controls the first fan 8 such that the first fan 8 operates at 100% power. If the sensed temperature is below the lower temperature threshold $T_{low}$ and the sensed humidity is above the upper humidity threshold $rHu_{up}$, the electronics 7 deactivates the first fan 8. In all other scenarios, the electronics 7 controls the first fan 8 such that it operates at the power values indicated in FIG. 4 which are between 0% and 100%.

In the embodiment shown in FIG. 1, the beehive system also comprises seven frames 4. When installed, the frames 4 are arranged in the housing 3. The frames 4 are parallel to each other and perpendicular to the barrier 5. Hence, the air flow generated by the first fan 8 can pass between the frames 4. Here, the first fan 8 is arranged below the frames 4.

In the embodiment shown in FIG. 1, the beehive system also comprises an external ambient condition sensor 18.

Figure 2:
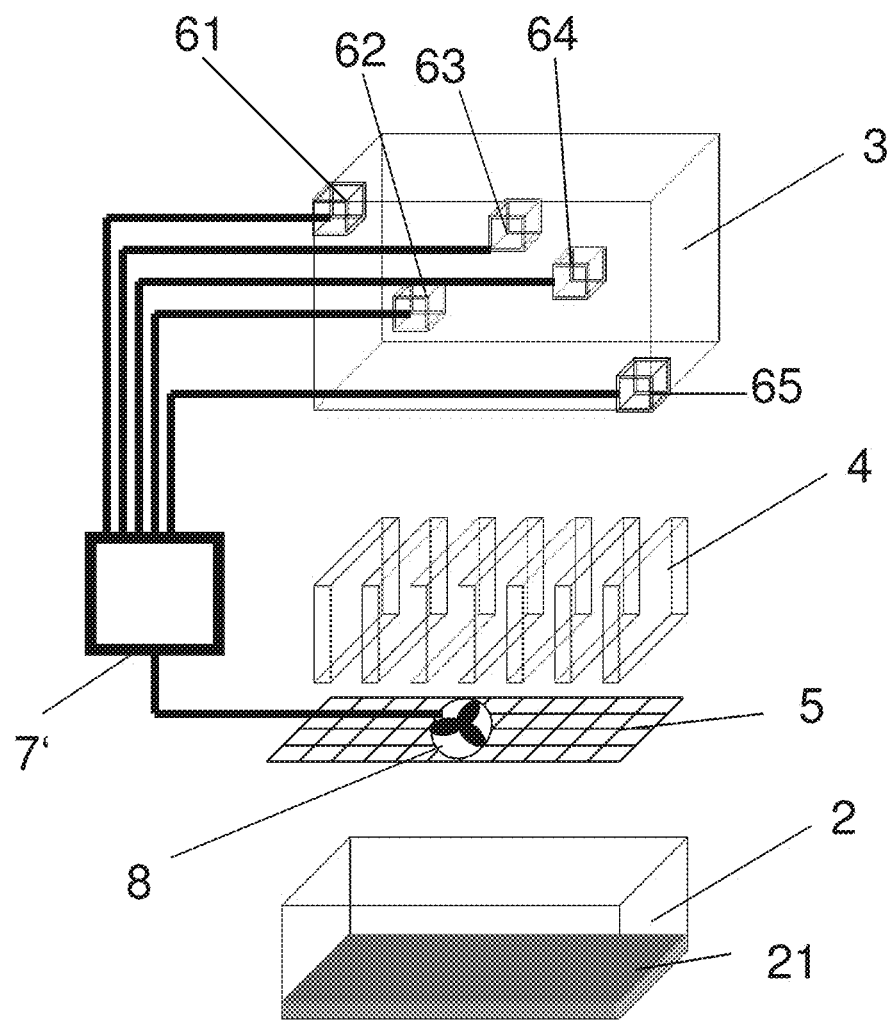
FIG. 2 shows a beehive system according to a second embodiment of the present invention comprising five ambient condition sensors.

FIG. 2 shows a second embodiment of the present invention which is similar to the first embodiment as shown in FIG. 1. The embodiment of FIG. 2 comprises five ambient condition sensors 61-65. In this embodiment, all ambient condition sensors 61-65 are dual sensors, i.e. each of the ambient condition sensors 61-65 comprises, both, a humidity sensor and a temperature sensor. Each of the ambient condition sensors 61-65 is connected to the electronics 7'. The electronics 7' is adapted to control the first fan 8 according to signals generated by the ambient condition sensors 61-65. As each of the ambient condition sensors 61-65 generates, both, a temperature signal and a humidity signal, the electronics 7' controls the fan 8 on the basis of ten signals.

For the control of the fan 8, the electronic 7' evaluates the temperature and humidity signals from the ambient condition sensors 61-65. Here, the electronics 7' performs an averaging of the five temperature signals and the five humidity signals, respectively. The ambient condition sensors 61-65 are distributed within the housing 3. Ambient condition sensor 61 is located in an upper corner of the housing 3. Sensors 62, 63, 64 are attached to side walls of the housing 3. Sensor 65 is positioned in a bottom corner of the housing 3 and is located adjacent to and above the barrier 5. To obtain an accurate measurement of the temperature and humidity inside the housing 3, the electronics 7' averages the temperature signals and the humidity signals, respectively, for controlling the first fan 8.

Figure 3:
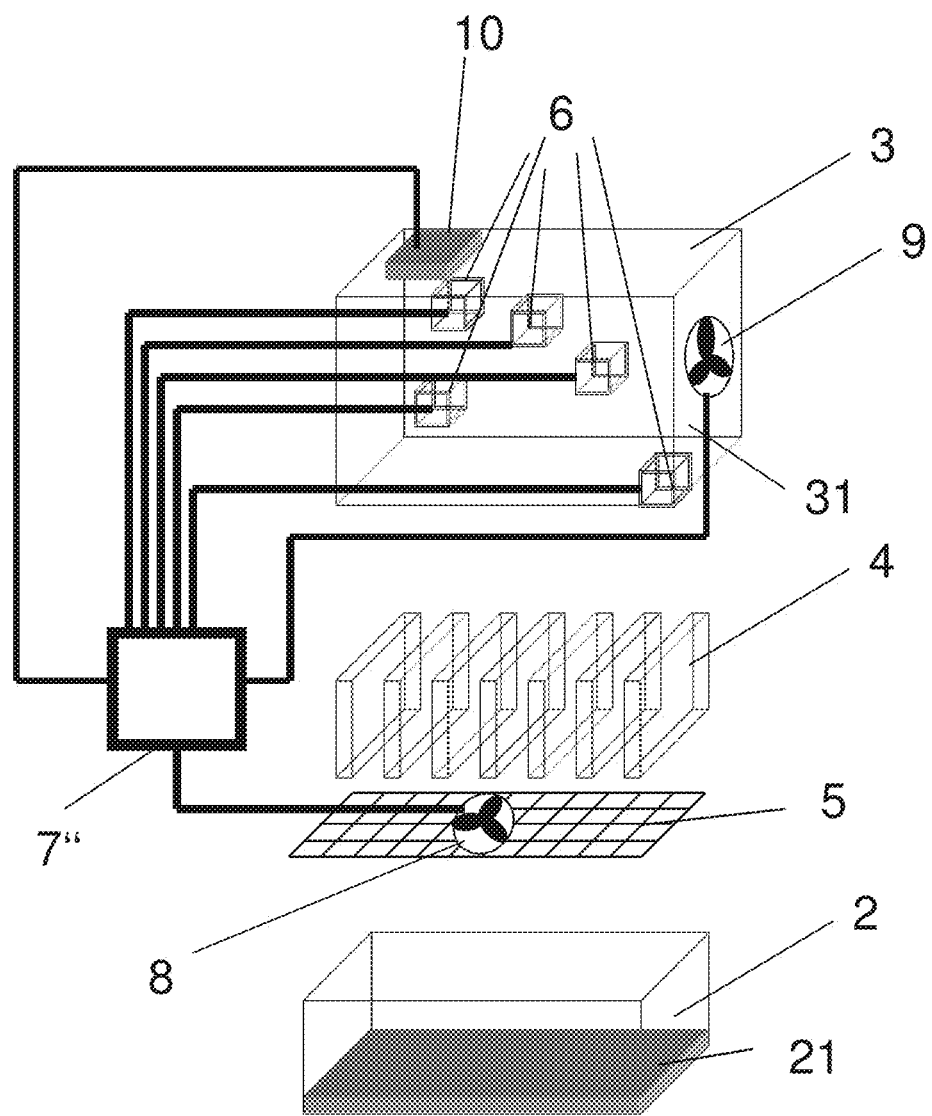
FIG. 3 shows a schematic view of a beehive system according to a third embodiment of the present invention further comprising a second fan and a solar cell.

In a third embodiment of the present invention as shown in FIG. 3, the beehive system further comprises a solar cell 10. The solar cell 10 is attached to the top of the housing 3. The solar cell 10 is connected to the electronics 7" and generates electrical power for driving the electronics 7" and the fan 8. The electronics 7", similarly to the embodiment as shown in FIG. 2, controls the first fan according to the ambient condition signals generated by the sensors 6 which are dual sensors for, both, temperature and humidity. Again, the electronics 7" performs an averaging of the temperature and humidity signals obtained from the dual sensors 6.

The beehive system of FIG. 3, moreover, comprises a second fan 9. The second fan 9 is arranged in an opening of a side wall 31 of the housing 3. The second fan 9 is also connected to the electronics 7". The electronics 7" controls the second fan 9 according to ambient conditions sensed by the sensors 6.

Figure 5:
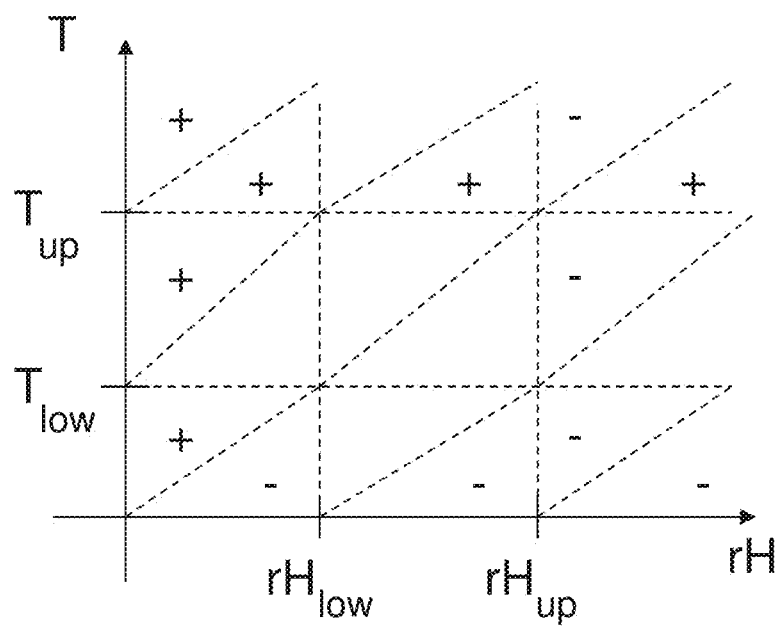
FIG. 5 shows a control diagram to be used with the system according to the third embodiment.

FIG. 5 shows a control map, according to which the electronics 7" may control the first fan 8 and the second fan 9. Similarly to FIG. 4, FIG. 5 shows a temperature axis and a humidity axis. Here, nine regions are shown, defined by upper and lower temperature and humidity thresholds. In each region, the powering state of the first fan 8 and of the second fan 9 by the electronics 7" is shown. Here, the left upper sign in each region indicates the powering of the first fan 8 and the lower right sign indicates the powering of the second fan 9. For example, if the sensed temperature T is above the upper temperature threshold and the relative humidity is below the lower humidity threshold, the first fan 8 is activated (+) and the second fan 9 is activated (+). If, however, the humidity is above the upper humidity threshold and the temperature T is still above the upper temperature threshold, the first fan 8 is deactivated (−), while the second fan 9 is still activated (+). Regions of FIG. 5 which neither carry a plus (+) or a minus (−) sign indicate that the powering state of the first and/or second fan is not changed by the electronic 7" as compared to the previous powering state when the sensed ambient condition enters that region of the diagram.

In this embodiment, the first fan 8 is activated if the sensed humidity is below the lower humidity threshold. This is independent of the sensed temperature. Moreover, the first fan 8 is deactivated if the sensed humidity is above the upper humidity threshold, no matter what the sensed temperature is. Analogously, the second fan 9 is activated if the sensed temperature T is above the upper temperature threshold, independent of the sensed humidity. Moreover, the second fan 9 is deactivated if the sensed temperature T is below the lower temperature threshold independent of the sensed humidity.

Reference Numerals
2 Container
21 Liquid
3 Housing
31 Side wall
4 Frame
5 Barrier
6, 61-65 Sensor
7, 7', 7" Electronics
8 First fan
9 Second fan
10 Solar cell
11 vent
12 tube
13 port
14 rewritable memory
15 interface
16 power supply

The invention claimed is:
1. A bee hive system comprising:
a housing,
at least one ambient condition sensor being adapted to sense an ambient condition in the housing,
a first fan being adapted to generate an air flow in at least a portion of the housing,
a container for a liquid having an opening, the liquid configured to directly contact an interior atmosphere of the container, and
removable frames being arranged in the housing,
wherein the system comprises between 5 and 20 of the removable frames being arranged in the housing, and/or wherein the removable frames are arranged above the container,
wherein the container is arranged such that the air flow generated by the first fan at least partially passes the opening of the container and increases evaporation of the liquid and in increases humidity in the housing,
electronics connected to the at least one ambient condition sensor and to the first fan,
wherein the electronics controls the first fan according to the sensed ambient condition.

2. The bee hive system 1, wherein the first fan is arranged at the opening of the container.

3. The bee hive system of claim 1, wherein the opening of the container is further provided with a barrier which is adapted to let air pass through.

4. The bee hive system of claim 3, wherein the barrier further comprises an aperture and wherein the first fan is arranged in the aperture of the barrier.

5. The bee hive system of claim 1, wherein the container is placed inside the housing or under the housing, and/or
    wherein the container further comprises a port for refilling the liquid, and/or
    wherein the bee hive system further comprises a tube with first and second open ends, the first end of the tube being in communication with the container and the second end being accessible from outside the beehive for refilling the liquid in the container,
    and/or wherein the container further comprises at least one ventilation hole in a top section of the container.

6. The bee hive system of claim 1, wherein the at least one ambient condition sensor comprises at least one humidity sensor, and
    wherein the electronics activates the first fan if the sensed humidity is below a lower humidity threshold, and wherein the lower humidity threshold is between 30% and 70% relative humidity, and/or
    wherein the electronics deactivates the first fan if the sensed humidity is above an upper humidity threshold and wherein the upper humidity threshold is between 50% and 90% relative humidity.

7. The bee hive system of claim 1, wherein the at least one ambient condition sensor comprises at least one temperature sensor, and
    wherein the electronics activates the first fan and/or a second fan, if a sensed temperature is above an upper temperature threshold, and wherein the upper temperature threshold is between 30° C. and 38° C., and/or
    wherein the electronics deactivates the first fan and/or the second fan, if the sensed temperature is below a lower temperature threshold, and wherein the lower temperature threshold is between 28° C. and 36° C.

8. The bee hive system of claim 1, wherein the at least one ambient condition sensor comprises two or more humidity sensors and wherein the sensed ambient condition corresponds to an averaged humidity sensed by the two or more humidity sensors,
    wherein the two or more humidity sensors are arranged as a unit to form at least one dual sensor or two or more dual sensors.

9. The bee hive system of claim 1, further comprising an external ambient condition sensor positioned outside the housing and connected to the electronics, wherein the electronics further controls the first and/or a second fan according to the ambient condition sensed by the external sensor.

10. The bee hive system of claim 1, further comprising a powering means being connected to the electronics, the first fan and/or a second fan, wherein the powering means comprises a battery and/or a solar cell.

11. The bee hive system of claim 1, wherein the electronics further comprises a re-writable memory to store program data, parameter values and/or the sensed ambient condition, and/or
    wherein the electronics further comprises an interface for exchanging a program and/or data with an electronic device and/or a storage medium.

12. The bee hive system of claim 1, wherein the container is comprised of plastics or wood.

13. The bee hive system of claim 1, wherein the housing further comprises one or more ventilation openings,
    wherein the one or more ventilation openings are arranged in a top section of the housing, and/or
    wherein the one or more ventilation openings are arranged in a vertical side wall of the housing.

14. The bee hive system of claim 1, wherein the container is comprised of waxed wood.

15. The bee hive system of claim 1, wherein the at least one ambient condition sensor comprises two or more temperature sensors and wherein the sensed ambient condition corresponds to an averaged temperature sensed by the two or more temperature sensors, wherein the two or more temperature sensors are arranged as a unit to form at least one dual sensor or two or more dual sensors.

16. The bee hive system of claim 1, wherein the at least one ambient condition sensor comprises at least one humidity sensor and at least one temperature sensor and wherein the electronics controls the first fan and/or a second fan according to a sensed humidity and a sensed temperature, wherein the at least one humidity sensor and the at least one temperature sensor are arranged as a unit to form at least one dual sensor or two or more dual sensors.

\* \* \* \* \*